(12) United States Patent
Zhao et al.

(10) Patent No.: US 11,326,985 B2
(45) Date of Patent: May 10, 2022

(54) INERTIAL REGULATION ACTIVE SUSPENSION SYSTEM BASED ON VEHICLE POSTURE DEVIATION, AND CONTROL METHOD THEREOF

(71) Applicant: Yanshan University, Qinhuangdao (CN)

(72) Inventors: Dingxuan Zhao, Qinhuangdao (CN); Mingde Gong, Qinhuangdao (CN); Shuang Liu, Qinhuangdao (CN); Zhuxin Zhang, Qinhuangdao (CN); Zhiguo Sun, Qinhuangdao (CN); Bin Yang, Qinhuangdao (CN); Tao Ni, Qinhuangdao (CN); Qinghe Guo, Qinhuangdao (CN); Mengke Yang, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 0 days.

(21) Appl. No.: 16/978,721

(22) PCT Filed: Aug. 1, 2019

(86) PCT No.: PCT/CN2019/098908
§ 371 (c)(1),
(2) Date: Sep. 7, 2020

(87) PCT Pub. No.: WO2020/052367
PCT Pub. Date: Mar. 19, 2020

(65) Prior Publication Data
US 2020/0398629 A1    Dec. 24, 2020

(30) Foreign Application Priority Data
Sep. 10, 2018    (CN) .......................... 201811051382.5

(51) Int. Cl.
*G01M 17/04*    (2006.01)
*B60G 17/015*    (2006.01)
(Continued)

(52) U.S. Cl.
CPC ........... *G01M 17/04* (2013.01); *B60G 17/018* (2013.01); *B60G 17/0152* (2013.01);
(Continued)

(58) Field of Classification Search
CPC .............. B60G 17/015; B60G 17/0152; B60G 17/0161; B60G 17/0162; B60G 17/0165;
(Continued)

(56) References Cited

U.S. PATENT DOCUMENTS

2005/0206099 A1     9/2005 Song
2006/0076740 A1*    4/2006 Sugiyama ................. B60L 7/00
                                                                         280/5.502
(Continued)

FOREIGN PATENT DOCUMENTS

CN    107168397 A    9/2017
CN    107791773 A    3/2018
(Continued)

*Primary Examiner* — Hunter B Lonsberry
*Assistant Examiner* — Daniel L Greene
(74) *Attorney, Agent, or Firm* — IPRO, PLLC (57) ABSTRACT

An inertial regulation active suspension system based on posture deviation of a vehicle and a control method thereof are provided. The system comprises a vehicle body, an inertial measurement unit, an electronic control unit, a servo controller group, a plurality of wheels, suspension servo actuating cylinders respectively corresponding to the wheels, and displacement sensors for measuring a stroke of the suspension servo actuating cylinders. The electronic control unit reads posture parameters of the vehicle body measured by the inertial measurement unit, and calculates a deviation between the postures of the vehicle body at a (Continued)

current moment and at a previous moment, and then outputs posture control parameters to the servo controller group. The servo controller group controls extension and retraction of each of the suspension servo actuating cylinders according to the posture control parameters and displacement feedback values of the displacement sensors.

8 Claims, 7 Drawing Sheets

(51) Int. Cl.
    *B60G 17/016* (2006.01)
    *B60G 17/018* (2006.01)
    *B60G 17/0195* (2006.01)

(52) U.S. Cl.
    CPC ..... *B60G 17/0161* (2013.01); *B60G 17/0195* (2013.01); *B60G 17/015* (2013.01); *B60G 2202/413* (2013.01); *B60G 2204/62* (2013.01); *B60G 2400/0511* (2013.01); *B60G 2400/0512* (2013.01); *B60G 2400/252* (2013.01); *B60G 2500/30* (2013.01); *B60G 2600/182* (2013.01); *B60G 2600/602* (2013.01); *B60G 2800/01* (2013.01)

(58) Field of Classification Search
CPC .............. B60G 17/018; B60G 17/0195; B60G 2202/40; B60G 2202/413; B60G 2204/62; B60G 2300/122; B60G 2400/0511; B60G 2400/0512; B60G 2400/252; B60G 2401/28; B60G 2500/30; B60G 2600/09; B60G 2600/182; B60G 2600/602; B60G 2800/01; B60G 2800/012; B60G 2800/014; B60G 2800/0192; B60G 2800/0194; B62D 61/06; G01M 17/04
See application file for complete search history.

(56) References Cited

U.S. PATENT DOCUMENTS

2010/0082202 A1    4/2010  Moshchuk et al.
2018/0162186 A1*  6/2018  Anderson .............. B60K 35/00

FOREIGN PATENT DOCUMENTS

| | | | |
|---|---|---|---|
| CN | 108501944 A | * | 9/2018 |
| CN | 109108601 A | | 1/2019 |
| JP | 2017128232 A | | 7/2017 |
| WO | WO-2006015592 A1 | * | 2/2006 ............ G09B 9/042 |

* cited by examiner

Fig.12

INERTIAL REGULATION ACTIVE SUSPENSION SYSTEM BASED ON VEHICLE POSTURE DEVIATION, AND CONTROL METHOD THEREOF

TECHNICAL FIELD

This disclosure relates to an active suspension system and a control method thereof, in particular to an active suspension system, in which a vehicle based on an active suspension vehicle performs inertia regulation on an active suspension mechanism by measuring a posture deviation of the vehicle, and a control method thereof. The present disclosure pertains to the technical field of vehicle control.

BACKGROUND

A suspension system is an important composition of a vehicle chassis. Ride comfort, handling stability and traveling safety of a vehicle can be determined directly depending on performance of the suspension system. Traditional vehicles adopt passive suspensions, which have suspension parameters designed according to specific road conditions. Once the suspension parameters are selected, it is difficult to be changed along with the road conditions and vehicle speed, so that the further improvement of driving performance of the vehicle is restricted.

With the development of electronic information technology and the progress in hydraulic and electrical drive technology, it is possible to use a controllable suspension in vehicle field. It is generally considered now that the controllable suspension technology is of an effective way to improve suspension performance. If rigidity and damping characteristics of the suspension system can be dynamically and adaptively adjusted according to driving conditions of the vehicle (including motion state of the vehicle and the road surface condition, etc.), such that the suspension system is always at the best vibration reduction state, which is called as an active suspension. The active suspension has many advantages, such as controlling a height of the vehicle body, improving trafficability, and taking the ride comfort and handling stability of the vehicle into account.

The active suspension technology mainly includes a control mechanism and a control strategy. Since control mechanism outputs an active force according to the requirement of the control strategy, a key point of designing the active suspension is to select the control strategy capable of providing better performance for the vehicle. Various suspension characteristics and damping effects can be generated according to different control strategies.

The control strategies of active suspension in the prior art mainly include: optimal control, preview control, adaptive control, fuzzy control, neural network control, ceiling damping control, sliding mode control, immune evolutionary control and the like. According to disclosure of the documents, no matter any of the afore-mentioned control methods is adopted, the performance of vehicles can be improved to some extents. However, there are still some problems that are existed in the control methods and have not been well solved yet, in particular, the vehicle suspension system is a typical complex system with multiple inputs and multiple outputs. One of the important issues is decoupling control, by which such complex systems can be controlled, while the control strategy in the prior art cannot provide a better solution for the decoupling control of the suspension system of the vehicle.

The posture adjustment and the ride comfort control of the vehicle are two important aspects to be considered in the suspension design. According to the existing research achievements, various mathematical models are established as desired and respective designs are accomplished independently, and it is considered that the overall performance of the vehicle is a sum of the performances of the subsystems; or the mathematical models are decompostured and then combined for control. The posture control and the ride comfort are not taken into account when the mathematical model is established, so that the design process is complicated.

SUMMARY

A technical problem to be solved by the present disclosure is to provide an inertia regulation active suspension system based on posture deviation of a vehicle and a control method thereof. As extension and retraction of suspension is actively controlled, a centroid of the vehicle is movable approximately along a straight line or an arc line when the vehicle travels on uneven roads, and the posture of a vehicle body remains approximately unchanged, thereby reducing vibration of the vehicle body when is traveling, and improving travel speed, handling stability and ride comfort of the vehicle when driving on a rough road.

To solve the above technical problem, a technical solution is employed in the present disclosure.

An inertial regulation active suspension system based on posture deviation of a vehicle includes a vehicle body and a plurality of wheels, an inertial measurement unit, an electronic control unit, a servo controller group, suspension servo actuating cylinders corresponding to the wheels one by one, and displacement sensors, wherein the inertial measurement unit, the electronic control unit and the servo controller group are secured to the vehicle body; the wheels are connected to a lower part of the vehicle body through the suspension servo actuating cylinders; the displacement sensors are used for measuring strokes of the suspension servo actuating cylinders; the electronic control unit is communicated with the inertial measurement unit and the servo controller group, respectively; the servo controller group is communicated with the displacement sensors; the electronic control unit reads vehicle posture parameters measured by the inertial measurement unit, and calculates a posture deviation of the vehicle at a current moment from at a previous moment, and then outputs the posture control parameters to the servo controller group; and the servo controller group controls each of the suspension servo actuating cylinders according to the position and posture control parameters output by the electronic control unit and displacement feedback values of the displacement sensors, so that a centroid of the vehicle moves approximately along a straight line or an arc line to permit the posture of the vehicle body to remain unchanged.

A control method of the inertial regulation active suspension system based on the posture deviation of the vehicle is provided, wherein a coordinate system OXYZ in which a center point O of the inertial measurement unit is taken as a coordinate origin is established, a right forward direction in which the vehicle travels is defined as a Y-axis positive direction, a right side direction in which the vehicle travels is defined as a X-axis positive direction, and an upward direction perpendicular to a XOY plane is defined as a Z-axis positive direction; a centroid of the vehicle body is defined as W; scanning periods are preset in the electronic control unit; and the control method comprises steps of:

1) in some scanning period, a vertical displacement $w_O$, a pitch angle $\alpha_O$ and a roll angle $\beta_O$ of the coordinate origin O are measured by the inertial measurement unit and output to the electronic control unit;

2) the electronic control unit calculates a vertical displacement $w_w$, a pitch angle $\alpha_w$ and a roll angle $\beta_w$ at the centroid W of the vehicle according to a geometric relationship of the centroid W relative to the coordinate origin O and the vertical displacement $w_O$, the pitch angle $\alpha_O$ and the roll angle $\beta_O$ of the coordinate origin O;

3) the electronic control unit performs a high-pass filter with a cutoff frequency $\omega_H$ on the vertical displacement $w_w$, the pitch angle $\alpha_w$ and the roll angle $\beta_w$, and after being filtered, the vertical displacement is $w_H$, the pitch angle is $\alpha_H$ and the roll angle is $\beta_H$; 4) the vertical displacement $w_H$, the pitch angle $\alpha_H$ and the roll angle $\beta_H$ obtained in step 3) are compared with values of the previous scanning period, to calculate variations $\Delta w$, $\Delta \alpha$, $\Delta \beta$ of the vertical displacement, the pitch angle and the roll angle; and $-\Delta w$, $\Delta \alpha$, $\Delta \beta$ are taken as posture relative correction quantities; a target value of the extension and retraction of each of the suspension servo actuating cylinders of the vehicle is calculated through an inverse kinematics algorithm of a vehicle suspension mechanism, and the target value is transmitted to the servo controller group such that displacement servo control is performed on each of the suspension servo actuating cylinders, thereby realizing the control of the vehicle body posture target, maintaining the vertical displacement $w_H$, the pitch angle $\alpha_H$ and the roll angle $\beta_H$ as stable as possible, and making a motion trajectory of the centroid of the vehicle in a straight line or in an arc line while keeping the posture of the vehicle body approximately unchanged.

$$\begin{cases} w_w = w_O + y_w \sin\alpha_O - x_w \sin\beta_O \\ \alpha_w = \alpha_O \\ \beta_w = \beta_O \end{cases}$$

Preferably, a calculation formula of the vertical displacement $w_w$, the pitch angle $\alpha_w$ and the roll angle $\beta_w$ at the centroid W of the vehicle is as follows:

wherein the centroid W has coordinates $x_W$, $y_W$ and $z_W$ in coordinate system OXYZ.

Preferably, the cut-off frequency $w_H$ is determined by following processes: S1, the vertical displacement $w_H$, the pitch angle $\alpha_H$ and the roll angle $\beta_H$ output after the high-pass filter all converge to 0 when the vehicle is stationary on a horizontal plane;

S2, the vertical displacement $w_H$, the pitch angle $\alpha_H$ and the roll angle $\beta_H$ output after the high-pass filter converge to a smaller value that is in an error range necessary for stable control of the system, when the vehicle stops at a transverse slope and a longitudinal slope for which a limit is allowed; and S3, a low value is selected by the cut-off frequency $w_H$ when conditions of S1 and S2 are satisfied.

Due to the technical scheme employed above, the technical progress can be achieved by the present disclosure as follows:

Compared with the traditional active suspension system and the control method thereof, the active suspension system based on the inertia regulation principle and the control method thereof as proposed by the present disclosure controls the posture of the vehicle body during the vehicle travels by controlling the extension and retraction of each of the servo actuating cylinders, to enable it to maintain approximately unchanged, so as to reduce the vibration of the vehicle body as traveling and improve the travel speed, handling stability and ride comfort of the vehicle which is traveling on the rough roads.

The active suspension system and the control method according to the present disclosure are employed such that adjustment of the vehicle posture and control of the ride comfort can be taken into account simultaneously, and the wheels of the vehicle as traveling are adjustable to adapt to the uneven road conditions such that influence of the road conditions on the posture of the vehicle body can be reduced to a lower level, that is, such complex system as the active suspension system with multiple inputs and multiple outputs can be well decoupled.

Integral errors that have change frequency slower in $w_w$, $\alpha_w$ and $\beta_w$ and the portion changed slowly in $w_w$, $\alpha_w$ and $\beta_w$ caused when the vehicle crosses a gentle slope are removed by the high-pass filter. The removal of the latter enables the vehicle to travel along an envelope surface of valleys without allowing the suspension stroke to reach a limit, and trafficability of the vehicle can be improved.

DETAILED DESCRIPTION

Hereinafter, the present disclosure will be further described in detail with reference to embodiments below.

The present disclosure provides an inertial regulation active suspension system based on posture deviation, which is suitable for a vehicle active suspension system with three or more wheels.

The conventional three-wheeled vehicles and four-wheeled vehicles are taken as an example to make explanation. A vehicle with more than four wheels can be constructed according to a construction principle and method of the four-wheeled vehicle.

According to the first embodiment, a three-wheeled vehicle inertial regulation active suspension system and a control method thereof are provided.

Figure 1:
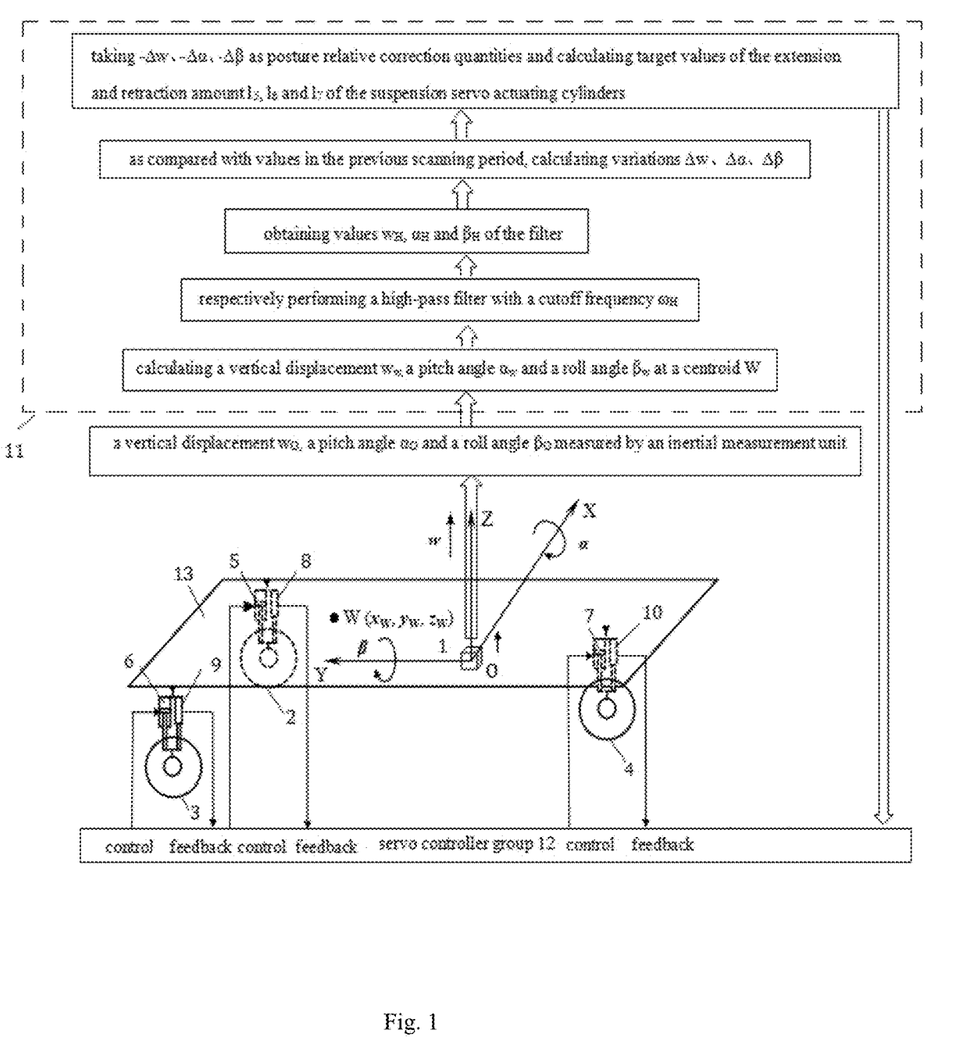
FIG. 1 is a structural schematic view of an inertial regulation active suspension system based on posture deviation.

As shown in FIG. 1, a vehicle body 13, an inertial measurement unit 1, wheels 2, 3, and 4, and suspension servo actuating cylinders 5, 6, and 7 respectively corresponding to the wheels 2, 3, and 4, displacement sensors 8, 9, and 10 respectively corresponding to the suspension servo actuating cylinders 5, 6, and 7, an electronic control unit 11, and a servo controller group 12 are included. The inertial measurement unit 1 is secured to the vehicle body 13. The wheels 2, 3 and 4 are connected a lower part of the vehicle body 13 through suspension servo actuating cylinders 5, 6 and 7, respectively. The displacement sensors 8, 9 and 10 are used to measure strokes of the suspension servo actuating cylinders 5, 6 and 7 respectively, and form measurement signals of displacement feedback values of the displacement sensors, and then transmit the measurement signals to the servo controller group 12. The electronic control unit 11 and the servo controller group 12 are fixedly mounted on the vehicle body 13. The electronic control unit 11 is in communication with the inertial measurement unit 1 and the servo controller group 12. The servo controller group 12 is in communication with the displacement sensors 8, 9 and 10. The electronic control unit 11 reads the vehicle posture parameters measured by the inertial measurement unit 1, calculates the posture deviation of the vehicle body at a current moment from the previous moment, and then outputs posture control parameters to the servo controller group 12. The servo controller group 12 controls extension and retraction of each of the suspension servo actuating cylinders 5, 6, 7 according to the posture control parameters output by the electronic control unit and the displacement feedback values of the displacement sensors, so as to allow the centroid of the vehicle to be movable approximately along a straight line or an arc line and keep the posture of the vehicle body unchanged.

As an example of a three-wheeled vehicle in this embodiment, the wheels and the suspension servo actuating cylinders thereof can form supporting points for the vehicle body, so that the posture of the vehicle body may be controlled in a manner that a plane can be determined by three points.

The inertial measurement unit 1 of the present disclosure may also be a gyroscope and other components capable of measuring inertial parameters.

The control method according to the present disclosure is that a coordinate system OXYZ is established for the whole vehicle and a centroid of the vehicle body is defined as W; a coordinate origin of the coordinate system is a center point O of the inertial measurement unit, and a right forward direction in which the vehicle travels is defined as a Y-axis positive direction, a right side direction in which the vehicle travels is defined as a X-axis positive direction, and an upward direction perpendicular to a XOY plane is defined as a Z-axis positive direction; and at the same time, scanning periods are preset in the electronic control unit. The control method according to the present disclosure comprises steps of:

In the first step, the coordinate origin O is taken as a measuring point. In some scanning period, a vertical displacement $w_O$, a pitch angle $\alpha_O$ and a roll angle $\beta_O$ of the coordinate origin O are measured by the inertial measurement unit and output to the electronic control unit. The $w_O$ is a vertical displacement of the vehicle body in a Z-axis direction at the coordinate origin O, $\alpha_O$ is a pitch angle of the vehicle body rotating around a X axis, and the $\beta_O$ is a roll angle of the vehicle body rotating around a Y axis.

In the second step, the posture parameters at the centroid W of the vehicle are calculated. The centroid of the vehicle body is defined as W. The electronic control unit calculates a vertical displacement $w_w$, a pitch angle $\alpha_w$ and a roll angle $\beta_w$ at the centroid W of the vehicle according to a geometric relationship of the centroid W relative to the coordinate origin O and the vertical displacement $w_O$, the pitch angle $\alpha_O$ and the roll angle $\beta_O$ of the coordinate origin O. The centroid W of the vehicle body has coordinates $x_W$, $y_W$ and $z_W$ in the coordinate system OXYZ. The $w_w$ is a vertical displacement of the centroid W of the vehicle in a Z-axis direction, the $\alpha_O$ is a pitch angle when the vehicle rotates in an axis parallel to the X-axis around the centroid W, and the $\beta_w$ is a roll angle when the vehicle rotates in an axis parallel to the Y-axis around the centroid W. A formula of the centroid W is as follows:

$$\begin{cases} w_w = w_O + y_w \sin\alpha_O - x_w \sin\beta_O \\ \alpha_w = \alpha_O \\ \beta_w = \beta_O \end{cases}$$

In the third step, the electronic control unit performs a high-pass filter with a cutoff frequency $\omega_H$ on the vertical displacement $w_w$, the pitch angle $\alpha_w$ and the roll angle $\beta_w$, and after being filtered, the vertical displacement $w_H$, the pitch angle $\alpha_H$ and the roll angle $\beta_H$ can be obtained. Integral errors that have change frequency slower in $w_w$, $\alpha_w$ and $\beta_w$ and the portion changed slowly in $w_w$, $\alpha_w$ and $\beta_w$ caused when the vehicle crosses a gentle slope are removed by the high-pass filter. The removal of the latter enables the vehicle to travel along an envelope surface of valleys without allowing the suspension stroke to reach a limit, and trafficability of the vehicle can be improved. The cutoff frequency $\omega_H$ can be determined by following experimental processes:

S1, the vertical displacement $w_H$, the pitch angle $\alpha_H$ and the roll angle $\beta_H$ output after the high-pass filter all converge to 0 when the vehicle is stationary on a horizontal plane;

S2, the vertical displacement $w_H$, the pitch angle $\alpha_H$ and the roll angle $\beta_H$ output after the high-pass filter converge to a smaller value that is in an error range necessary for stable control of the system, when the vehicle stops at a transverse slope and a longitudinal slope for which a limit is allowed; and S3, a low value is selected by the cut-off frequency $w_H$ when conditions of S1 and S2 are satisfied.

In the fourth step, the vertical displacement $w_H$, the pitch angle $\alpha_H$ and the roll angle $\beta_H$ are kept as stable as possible by controlling the extension and retraction of each of the suspension servo actuating cylinders, such that a motion trajectory of the centroid of the vehicle is in a straight line or an arc line and the posture of the vehicle body remains approximately unchanged. Specifically, the vertical displacement $w_H$, the pitch angle $\alpha_H$ and the roll angle $\beta_H$ obtained in the third step are compared with the same values in the previous scanning period, to calculate variations $\Delta w$, $\Delta \alpha$, $\Delta \beta$ of the vertical displacement, the pitch angle and the roll angle; and $-\Delta w$, $\Delta \alpha$, $\Delta \beta$ are taken as posture relative correction quantities; target values of the extension and retraction amount $l_5$, $l_6$ and $l_7$ of the suspension servo actuating cylinders 5, 6 and 7 of the vehicle are calculated and are transmitted to the servo controller group 12, such that displacement servo control is performed on each of the suspension servo actuating cylinders, thereby realizing the control of the vehicle body posture target, maintaining the vertical displacement $w_H$, the pitch angle $\alpha_H$ and the roll angle $\beta_H$ as stable as possible, and making a motion trajectory of the centroid of the vehicle in a straight line or in an arc line while keeping the posture of the vehicle body approximately unchanged. The target values of the extension and retraction amount of the suspension servo actuating cylinders can be calculated through an inverse kinematics algorithm of a vehicle suspension mechanism.

According to the second embodiment, a four-wheeled vehicle inertial regulation active suspension system based on posture deviation and a control method thereof are provided.

Figure 2:
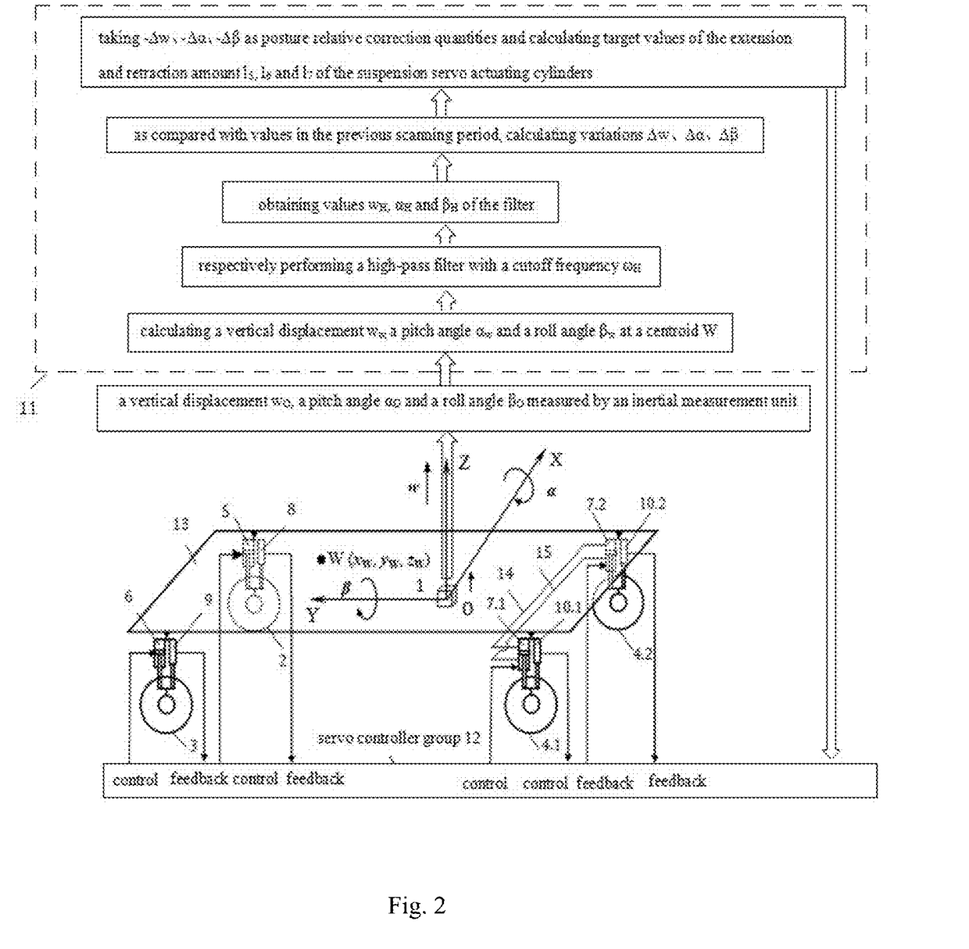
FIG. 2 is a structural schematic view of a four-wheeled vehicle inertial regulation active suspension system based on posture deviation.

As shown in FIG. 2, as an example of a four-wheeled vehicle in this embodiment, the system includes a vehicle body 13, an inertial measurement unit 1, wheels 2, 3, 4.1 and 4.2, and suspension servo actuating cylinders 5, 6, 7.1 and 7.2 respectively corresponding to the wheels 2, 3, 4.1 and 4.2, displacement sensors 8, 9, 10.1 and 10.2 respectively corresponding to the suspension servo actuating cylinders 5, 6, 7.1 and 7.2, an electronic control unit 11, and a servo controller group 12. The inertial measurement unit 1 is secured to the vehicle body 13. The wheels 2, 3, 4.1 and 4.2 are connected a lower part of the vehicle body 13 through suspension servo actuating cylinders 5, 6, 7.1 and 7.2, respectively. The displacement sensors 8, 9, 10.1 and 10.2 are used to measure strokes of the suspension servo actuating cylinders 5, 6, 7.1 and 7.2 respectively. The electronic control unit 11 and the servo controller group 12 are secured to the vehicle body 13. The electronic control unit 11 is in communication with the inertial measurement unit 1 and the servo controller group 12. The servo controller group 12 is in communication with the displacement sensors 8, 9, 10.1 and 10.2.

One of the control methods of the four-wheeled vehicle according to the present disclosure is the same as that in the first embodiment, that is, scanning periods are preset inside the electronic control unit. In some scanning period, the electronic control unit 11 reads the vehicle posture parameters measured by the inertial measurement unit 1, calculates the posture deviation of the vehicle at a current moment from the previous moment, and then outputs posture control parameters to the servo controller group 12. The servo controller group 12 controls action of each of the suspension servo actuating cylinders 5, 6, 7.1 and 7.2 according to the posture control parameters output by the electronic control unit and the displacement feedback values of the displacement sensors, so as to allow the centroid of the vehicle to be movable approximately along a straight line or an arc line and keep the posture of the vehicle body unchanged.

According to the four-wheeled vehicle in this embodiment, upper chambers and lower chambers of the suspension servo actuating cylinders 7.1 and 7.2 corresponding to the wheels 4.1 and 4.2 are individually communicated; that is, the upper chambers of the suspension servo actuating cylinders 7.1 and 7.2 are connected with each other through an upper chamber connecting pipeline 14; the lower chambers of the suspension servo actuating cylinders 7.1 and 7.2 are connected with each other through a lower chamber connecting pipeline 15. As such, function of the wheels 4.1 and 4.2 and the suspension servo actuating cylinders thereof supporting the vehicle body is equivalent to that of the supporting point, while the other two wheels 2 and 3 and the suspension servo actuating cylinders thereof respectively form supporting points for the vehicle body. As for the conventional vehicle, two rear wheels and the suspension servo actuating cylinders thereof have the same structure, so that the equivalent supporting point is considered as a midpoint of an upper hinge point on the suspension servo actuating cylinders 7.1 and 7.2 corresponding to the wheels 4.1 and 4.2. A height of the equivalent supporting point is controlled by controlling an average value (shown by 17 in FIG. 2) of the extension and retraction of the suspension servo actuating cylinders 7.1 and 7.2. Subsequently, the control method of this embodiment is exactly the same as that of the first embodiment, except for setting the two wheels of this embodiment as one wheel group and applying the control method of the first embodiment to that of the wheel group, which will be omitted herein.

A vehicle with four or more wheels may refer to the method of the second embodiment, that is, the vehicle with four or more wheels can be divided into three wheel groups, each of which is provided with one or more wheels. When the number of wheels of the wheel group is more than one, the upper chambers of the suspension servo actuating cylinders in the wheel group are communicated with one another and the lower chambers of the suspension servo actuating cylinders in the wheel group are communicated with one another, so that the wheel group constitutes a supporting point for supporting the vehicle body, and the three wheel groups constitute three supporting points of the vehicle body. The posture of the vehicle body can be controlled by controlling supporting heights of the three supporting points. The present disclosure provides a control method for the vehicle with four or more wheels, which arranges all wheels of the vehicle with more than three wheels into three wheel groups and controls the posture of the vehicle body based on a principle that a plane is determined by three points, thus the control method is suitable for all vehicles with more than three wheels. At the same time, the wheels that are close to each other in position are selected to form the wheel group in order to facilitate for the communication of the upper chambers and the lower chambers of the suspension servo actuating cylinders in the wheel group. The structure and the size of the wheels in the wheel group and the suspension servo actuating cylinders are the same as that of the displacement sensors as possible when being grouped, in order to determine the supporting points of the wheel group. According to the present disclosure, the interference of integral accumulated error signals in signals is reduced by real-time scanning and monitoring the vertical displacement, the pitch angle and the roll angle of the vehicle coordinate origin in each of the periods, and performing the high-pass filter on the scanning values, and then the extension and retraction of the suspension servo actuating cylinder of each of the wheel groups is calculated through the inverse kinematics algorithm of the vehicle suspension mechanism according to the vertical displacement, the pitch angle and the roll angle after being filtered, so as to allow the motion of the vehicle centroid approximately along a straight line or an arc line and keep the posture of the vehicle body approximately unchanged, thus greatly reducing the vibration of the vehicle body.

Figure 3:
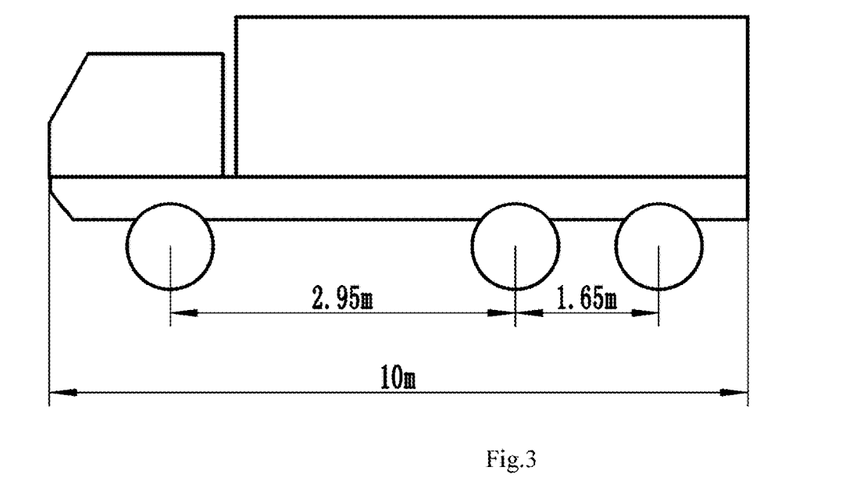
FIG. 3 is a schematic view of a three-axle vehicle used in a test.

As development of the present disclosure is proceeded, a comparison test between a posture that a three-axle vehicle equipped with an inertial regulation active suspension system based on posture deviation crosses a triangle obstacle and a posture that a three-axle vehicle equipped with a passive oleo-preumatic suspension system crosses the triangle obstacle is carried out. The three-axle vehicle used in the test is shown in FIG. 3. The three-axle vehicle has a length of 10 m, a wheelbase of (2.95+1.65) m, an overall weight of 36 t, an shaft load of 12 t and a suspension stroke of ±0.11 m. In the test, one of the two three-axle vehicles is equipped with the active suspension system of the present disclosure and is controlled by the method of the present disclosure, and the other three-axle vehicle is equipped with the passive oleo-pneumatic suspension system. During the test, the upper chambers of the suspension servo actuating cylinders corresponding to the two front wheels of the three-shaft six-wheel vehicle are in communication through connecting pipelines, and the lower chambers of the suspension servo actuating cylinders corresponding to the two front wheels of the three-shaft six-wheel vehicle are in communication through connecting pipelines, such that the function of the front wheels and the suspensions supporting the vehicle body is equivalent to that of one supporting point; the upper chambers and the lower chambers of the suspension servo actuating cylinders corresponding to the two wheels on the right side of the two shafts on the rear of the vehicle are respectively in communication through connecting pipelines, such that the function of the two wheels on the right rear side supporting the vehicle body is equivalent to that of one supporting point; the upper chambers and the lower chambers of the suspension servo actuating cylinders corresponding to the two wheels on the left sides of the two shafts on the rear of the vehicle are respectively in communication through connecting pipelines, such that the function of the two wheels on the left rear side supporting the vehicle body is equivalent to that of one supporting point. In this way, the vehicle body totally has three supporting points. The four wheels and the suspension servo actuating cylinders at the rear of the vehicle have the same structure.

Figure 4:
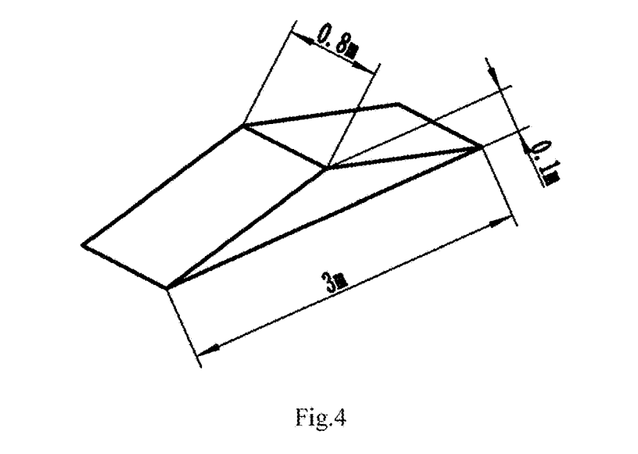
FIG. 4 is a schematic view of triangle obstacle used in a test.

All triangle obstacles used in the test are shown in FIG. 4 and have a length of 3 m, a width of 0.8 m and a height of 0.1 m.

Figure 5:
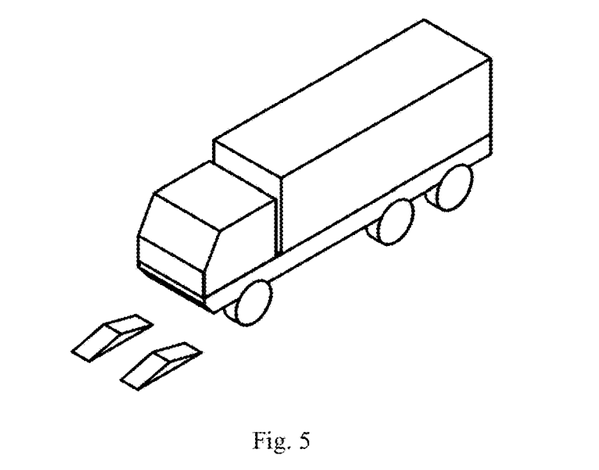
FIG. 5 is a schematic view of a test solution for measuring variation of a pitch angle.

FIG. 5 is a schematic view of s test solution for measuring variation of a pitch angle. In this test solution, two triangular obstacles that are identical to each other are symmetrically placed based on a wheelbase, and the wheels on the left and right sides of the vehicle simultaneously cross the triangular obstacles, in this way, the variations of the pitch angle of the vehicle body and the vertical acceleration of the centroid thereof can be measured.

Figure 6:
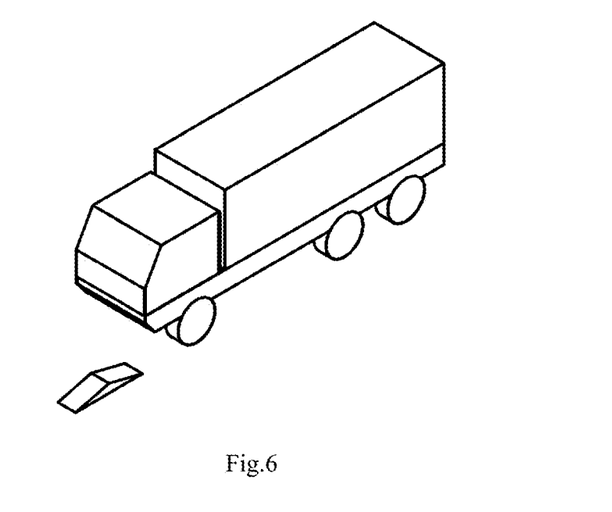
FIG. 6 is a schematic view of a test solution for measuring variation of a roll angle.

FIG. 6 is a schematic view of a test solution for measuring variation of a roll angle. In this test solution, only one triangular obstacle is placed on one side (left or right side) of the vehicle, and only the wheels on the side corresponding to the triangular obstacle cross the triangular obstacle, in this way, the variations of the roll angle of the vehicle body can be measured.

Figure 7:
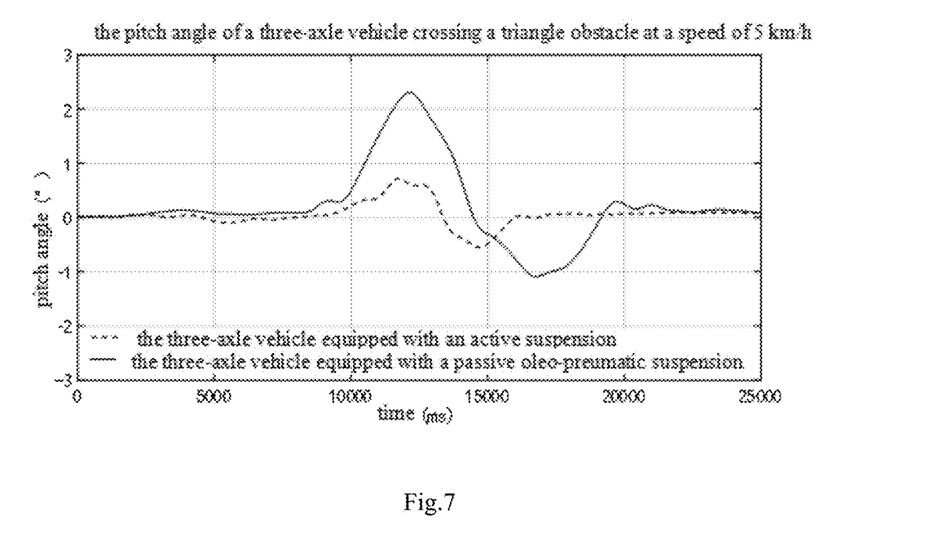
FIG. 7 is a comparison view of variation in the pitch angle of the vehicle body measured when a three-axle vehicle crosses a triangular obstacle at a speed of 5 km/h.
Figure 8:
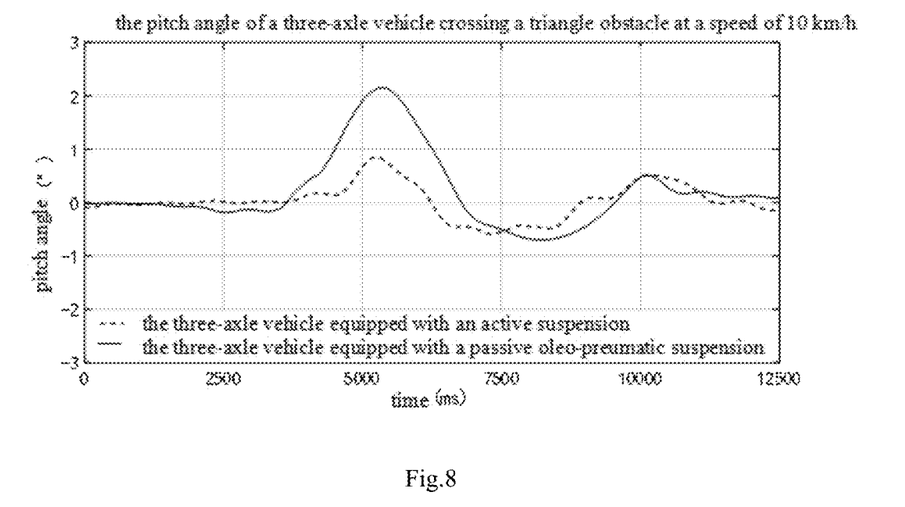
FIG. 8 is a comparison view of variation in the pitch angle of the vehicle body measured when a three-axle vehicle crosses a triangular obstacle at a speed of 10 km/h.

FIG. 7 and FIG. 8 show variation of the pitch angle of the vehicle body when the wheels on both sides cross the triangle obstacle at a speed of 5 km/h and at a speed of 10 km/h respectively according to the test solution shown in FIG. 5. It can be seen from FIG. 7 and FIG. 8 that the pitch angle varies between −1° and 1° when the three-axle vehicle equipped with the active suspension system of the present application crosses the triangular obstacle; and the pitch angle varies between −1° and 2.5° when the three-axle vehicle equipped with the passive oleo-pneumatic suspension system crosses the triangular obstacle. As compared with the passive oleo-pneumatic suspension system, the pitch angle of the vehicle body with the active suspension system and the control method of the present disclosure is greatly reduced.

Figure 9:
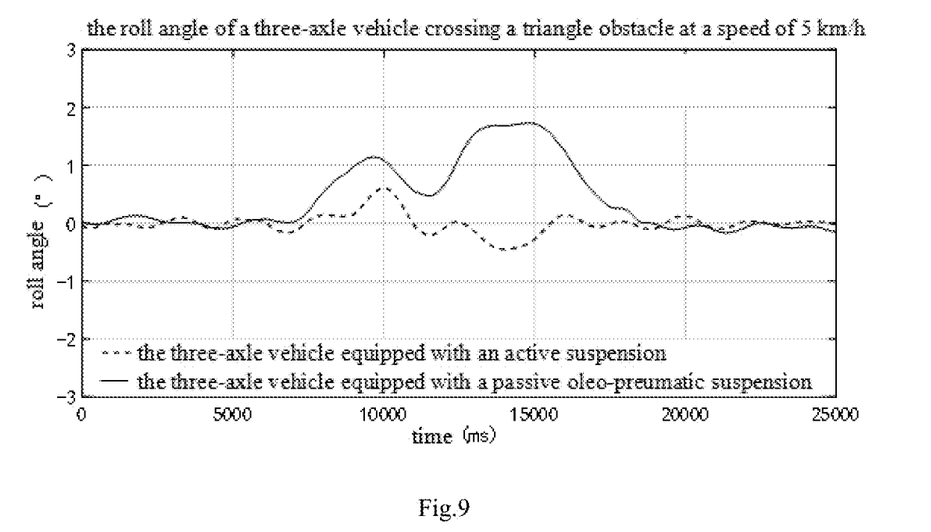
FIG. 9 is a comparison view of variation in a roll angle measured when a three-axle vehicle crosses a triangular obstacle at a speed of 5 km/h.
Figure 10:
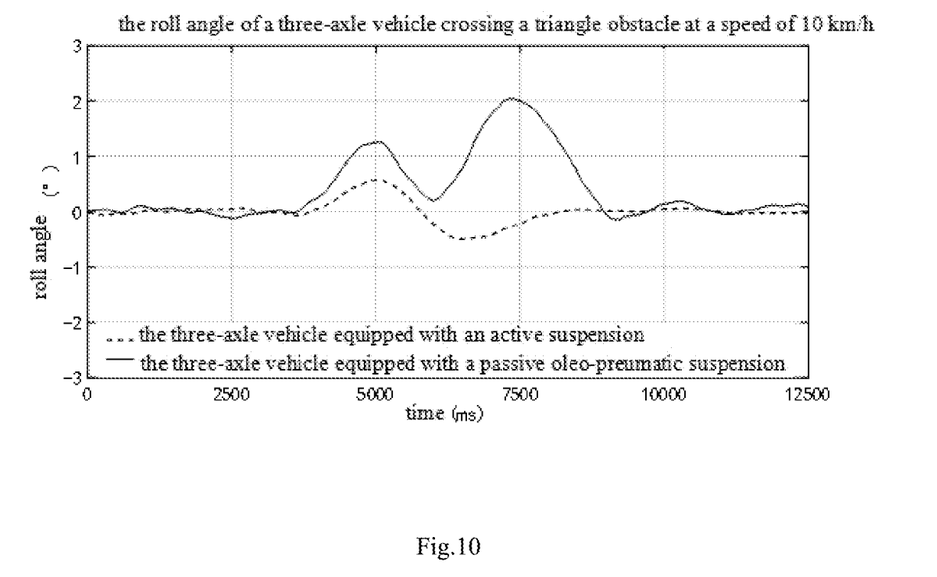
FIG. 10 is a comparison view of variation in a roll angle measured when a three-axle vehicle crosses a triangular obstacle at a speed of 10 km/h.

FIG. 9 and FIG. 10 show variation of a roll angle of the vehicle body when the wheels on one side cross the triangle obstacle at a speed of 5 km/h and at a speed of 10 km/h respectively according to the test solution shown in FIG. 6. It can be seen from FIG. 9 and FIG. 10 that the roll angle varies between −1° and 1° when the three-axle vehicle equipped with the active suspension system of the present disclosure crosses the triangular obstacle; and the roll angle varies −1° and 2° when the three-axle vehicle equipped with the passive oleo-pneumatic suspension system crosses the triangular obstacle. As compared with the passive oleo-pneumatic suspension system, the roll angle of the vehicle body with the active suspension system and the control method of the present disclosure is greatly reduced.

Figure 11:
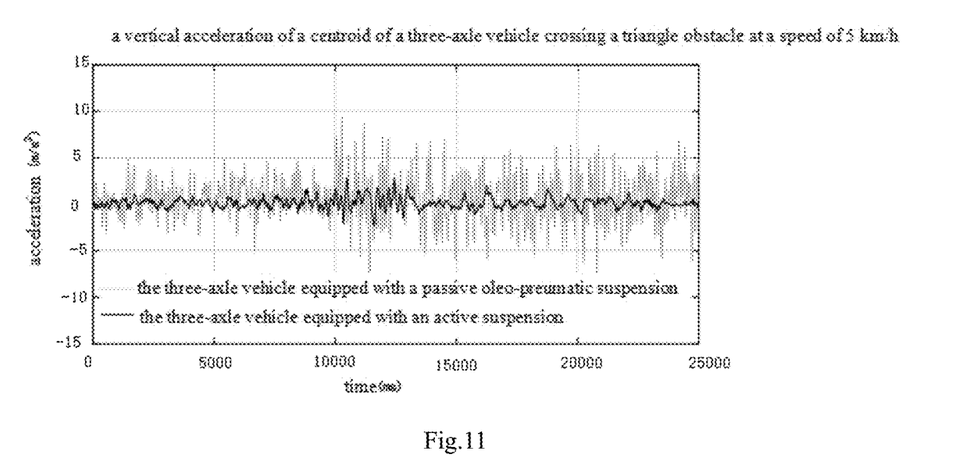
FIG. 11 is a comparison view of a vertical acceleration of a centroid of the vehicle body measured when the three-axle vehicle crosses a triangle obstacle at a speed of 5 km/h.
Figure 12:
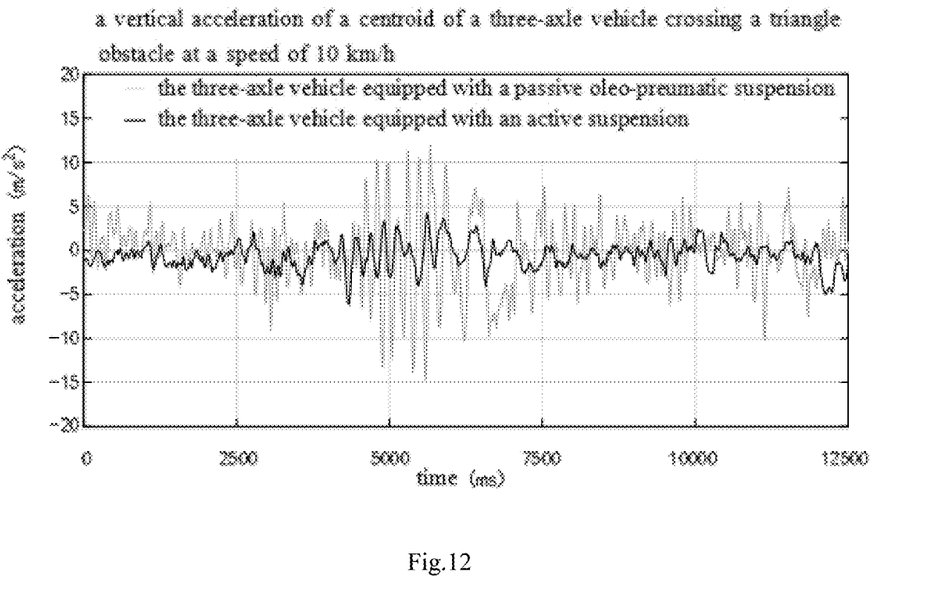
FIG. 12 is a comparison view of a vertical acceleration of a centroid of the vehicle body measured when the three-axle vehicle crosses a triangle obstacle at a speed of 10 km/h.

FIG. 11 and FIG. 12 show variation of vertical acceleration of a centroid of the vehicle body when the wheels on both sides cross the triangle obstacle at a speed of 5 km/h and at a speed of 10 km/h respectively according to the test solution shown in FIG. 5. It can be seen from FIG. 11 and FIG. 12 that as compared with the passive oleo-pneumatic suspension system, an amplitude of the vertical acceleration of the centroid of the three-axle vehicle is obviously reduced and the vibration of the vehicle body is obviously reduced, when the three-axle vehicle the active suspension system and the control method of the present disclosure crosses the triangle obstacle. The amplitude of the vertical acceleration of the vehicle crossing the triangle obstacle does not have greater variation than the amplitude of the vertical acceleration of the vehicle traveling on the flat road.

As can be seen from the above comparison test, the inertial regulation active suspension system based on posture deviation as proposed by the present disclosure can effectively reduce the vibration of the vehicle body and improve the handling stability and ride comfort of the vehicle.

Ultimately, it should be noted that the above-mentioned embodiments are only used to illustrate the technical solution of the present disclosure, rather than limit the present disclosure. Although the present disclosure has been described in detail with reference to the foregoing embodiments, it should be understood by the person skilled in the art that it is allowable to modify the technical solution described in the foregoing embodiments or equivalently substituting some or all of the technical features; however, these modifications or substitutions do not cause the corresponding technical solutions to substantively depart from the scope of the technical solutions of various embodiments of the present disclosure.

What is claimed is:

1. An inertial regulation active suspension system based on posture deviation of a vehicle, comprising a vehicle body and a plurality of wheels, an inertial measurement unit, an electronic control unit, a servo controller group, suspension servo actuating cylinders corresponding to the wheels one by one, and displacement sensors, wherein the inertial measurement unit, the electronic control unit and the servo controller group are secured to the vehicle body; the wheels are connected to a lower part of the vehicle body through the suspension servo actuating cylinders; the displacement sensors are used for measuring strokes of the suspension servo actuating cylinders; the electronic control unit is communicated with the inertial measurement unit and the servo controller group, respectively; the servo controller group is communicated with the displacement sensors; the electronic control unit reads vehicle posture parameters measured by the inertial measurement unit, and calculates a posture deviation of the vehicle at a current moment from at a previous moment, and then outputs the posture control parameters to the servo controller group; and the servo controller group controls each of the suspension servo actuating cylinders according to the position and posture control parameters output by the electronic control unit and displacement feedback values of the displacement sensors, so that a centroid of the vehicle moves approximately along a straight line or an arc line to permit a posture of the vehicle body to remain unchanged;

all of the wheels are divided into three wheel groups, each of the three wheel groups is provided with one or more wheels; the number of the wheels in at least one of the three wheel groups is more than one, upper chambers of the suspension servo actuating cylinders in the wheel group are communicated with one another and lower chambers of the suspension servo actuating cylinders in the wheel group are communicated with one another, so that the wheel group constitutes a supporting point for supporting the vehicle body, and the three wheel groups constitute three supporting points of the vehicle body; the posture of the vehicle body is controlled by controlling supporting heights of the three supporting points.

2. A control method of the inertial regulation active suspension system based on the posture deviation of the vehicle according to claim 1, wherein a coordinate system OXYZ in which a center point O of the inertial measurement unit is taken as a coordinate origin is established, a right forward direction in which the vehicle travels is defined as a Y-axis positive direction, a right side direction in which the vehicle travels is defined as a X-axis positive direction, and an upward direction perpendicular to a XOY plane is defined as a Z-axis positive direction; a centroid of the vehicle body is defined as W; scanning periods are preset in the electronic control unit; and the control method comprises steps of:

1) in some scanning period, a vertical displacement $w_O$, a pitch angle $\alpha_O$ and a roll angle $\beta_O$ of the coordinate origin O are measured by the inertial measurement unit and output to the electronic control unit;

2) the electronic control unit calculates a vertical displacement $w_w$, a pitch angle $\alpha_w$, and a roll angle $\beta_w$ at the centroid W of the vehicle according to a geometric relationship of the centroid W relative to the coordinate origin O and the vertical displacement $w_O$, the pitch angle $\alpha_O$ and the roll angle $\beta_O$ of the coordinate origin O;

3) the electronic control unit performs a high-pass filter with a cutoff frequency WET on the vertical displacement $w_w$, the pitch angle $\alpha_w$ and the roll angle $\beta_w$, and after being filtered, the vertical displacement is $w_H$, the pitch angle is $\alpha_H$ and the roll angle is $\beta_H$; wherein the cut-off frequency $w_H$ is determined by following ways: S1, the vertical displacement $w_H$, the pitch angle $\alpha_H$ and the roll angle $\beta_H$ output after the high-pass filter all converge to 0 when the vehicle is stationary on a horizontal plane; S2, the vertical displacement $w_H$ the pitch angle $\alpha_H$ and the roll angle $\beta_H$ output after the high-pass filter converge to a smaller value that is in an error range necessary for stable control of the system, when the vehicle stops at a transverse slope and a longitudinal slope for which a limit is allowed; and S3, a smaller value is selected by the cut-off frequency $w_H$ when conditions of S1 and S2 are satisfied;

4) the vertical displacement $w_H$, the pitch angle $\alpha_H$ and the roll angle $\beta_H$ obtained in step 3) are compared with values of the previous scanning period, to calculate variations $\Delta w$, $\Delta \alpha$, $\Delta \beta$ of the vertical displacement, the pitch angle and the roll angle; and $\Delta w$, $\Delta \alpha$, $\Delta \beta$ are taken as posture relative correction quantities; a target value of the extension and retraction of each of the suspension servo actuating cylinders of the vehicle is calculated through an inverse kinematics algorithm of a vehicle suspension mechanism, and the target value is transmitted to the servo controller group such that displacement servo control is performed on each of the suspension servo actuating cylinders, thereby realizing the control of the vehicle body posture target, maintaining the vertical displacement $w_H$, the pitch angle $\alpha_H$ and the roll angle $\beta_H$ as stable as possible, and making a motion trajectory of the centroid of the vehicle in a straight line or in an arc line while keeping the posture of the vehicle body approximately unchanged.

3. The control method of the inertial regulation active suspension system based on the posture deviation of the vehicle according to claim 2, wherein a calculation formula of the vertical displacement $w_w$, the pitch angle $\alpha_w$, and the roll angle $\beta_w$, at the centroid W of the vehicle is as follows:

$$\begin{cases} w_w = w_O + y_w \sin\alpha_O - x_w \sin\beta_O \\ \alpha_w = \alpha_O \\ \beta_w = \beta_O \end{cases}$$

wherein the centroid W has coordinates xw, yw and zw in coordinate system OXYZ.

4. The inertial regulation active suspension system based on posture deviation of the vehicle according to claim 1, wherein the at least one of the three wheel groups includes two rear wheels; upper chambers of two suspension servo actuating cylinders corresponding to the two rear wheels are communicated with one another and lower chambers of the two suspension servo actuating cylinders corresponding to the two rear wheels are communicated with one another.

5. The inertial regulation active suspension system based on posture deviation of the vehicle according to claim 4, wherein the upper chambers of the two suspension servo actuating cylinders corresponding to the two rear wheels are communicated with one another through an upper chamber connecting pipeline; and the lower chambers of the two suspension servo actuating cylinders corresponding to the two rear wheels are communicated with one another through a lower chamber connecting pipeline.

6. The inertial regulation active suspension system based on posture deviation of the vehicle according to claim 4, wherein in the at least one of the three wheel groups, the two rear wheels and the suspension servo actuating cylinders thereof have the same structure.

7. The inertial regulation active suspension system based on posture deviation of the vehicle according to claim 1, wherein the vehicle body is provided with three shafts; the three shafts include a front shaft located under the front of the vehicle and two rear shafts; the plurality of wheels include six wheels; the six wheels include two front wheels mounted on the front shaft and four rear wheels mounted on the two rear wheels; the two front wheels belong to one wheel group, upper chambers of two suspension servo actuating cylinders corresponding to the two front wheels are communicated with one another and lower chambers of the two suspension servo actuating cylinders corresponding to the two front wheels are communicated with one another;

among the four rear wheels, two rear wheels located at a first side of the vehicle body, belong to one wheel group, upper chambers of two suspension servo actuating cylinders corresponding to the two rear wheels located at the first side of the vehicle body are communicated with one another and lower chambers of the two suspension servo actuating cylinders corresponding to the two rear wheels located at the first side of the vehicle body are communicated with one another;

among the four rear wheels, two rear wheels located at a second side of the vehicle body, belong to one wheel group, upper chambers of two suspension servo actuating cylinders corresponding to the two rear wheels located at the second side of the vehicle body are communicated with one another and lower chambers of the two suspension servo actuating cylinders corresponding to the two rear wheels located at the second side of the vehicle body are communicated with one another.

8. The inertial regulation active suspension system based on posture deviation of the vehicle according to claim 7, wherein the upper chambers of the two suspension servo actuating cylinders corresponding to the two front wheels are communicated with one another through a first upper chamber connecting pipeline and lower chambers of the two suspension servo actuating cylinders corresponding to the two front wheels are communicated with one another through a first lower chamber connecting pipeline;

the upper chambers of the two suspension servo actuating cylinders corresponding to the two rear wheels located at the first side of the vehicle body are communicated with one another through a second upper chamber connecting pipeline and the lower chambers of the two suspension servo actuating cylinders corresponding to the two rear wheels located at the first side of the vehicle body are communicated with one another through a second lower chamber connecting pipeline;

the upper chambers of the two suspension servo actuating cylinders corresponding to the two rear wheels located at the second side of the vehicle body are communicated with one another through a third upper chamber connecting pipeline and lower chambers of the two suspension servo actuating cylinders corresponding to the two rear wheels located at the second side of the vehicle body are communicated with one another through a third lower chamber connecting pipeline.

* * * * *